(12) United States Patent
Leone et al.

(10) Patent No.: US 11,300,063 B2
(45) Date of Patent: *Apr. 12, 2022

(54) SYSTEMS AND METHODS FOR SPLIT LAMBDA CATALYST HEATING

(71) Applicant: Ford Global Technologies, LLC, Dearborn, MI (US)

(72) Inventors: Thomas G. Leone, Ypsilanti, MI (US); Peter C. Moilanen, Ann Arbor, MI (US); Xiaogang Zhang, Novi, MI (US); Jianwen James Yi, West Bloomfield, MI (US); Steven Schwochert, Garden City, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/933,122

(22) Filed: Jul. 20, 2020

(65) Prior Publication Data

US 2022/0018298 A1 Jan. 20, 2022

(51) Int. Cl.
| | |
|---|---|
| *F02D 37/02* | (2006.01) |
| *F02D 41/02* | (2006.01) |
| *F02D 41/40* | (2006.01) |
| *F02D 41/14* | (2006.01) |
| *F02P 5/145* | (2006.01) |
| *F02D 41/00* | (2006.01) |

(52) U.S. Cl.
CPC ....... *F02D 41/025* (2013.01); *F02D 41/0085* (2013.01); *F02D 41/1475* (2013.01); *F02D 41/402* (2013.01); *F02P 5/145* (2013.01); *F02D 37/02* (2013.01); *F02D 2200/0802* (2013.01); *F02D 2200/0816* (2013.01)

(58) Field of Classification Search
CPC .... F02D 37/02; F02D 41/0082; F02D 41/025; F02D 41/0085; F02D 41/1475; F02D 41/402; F02D 2200/0802; F02D 2200/0816; F02P 5/145
See application file for complete search history.

(56) References Cited

U.S. PATENT DOCUMENTS

| | | | | |
|---|---|---|---|---|
| 5,207,053 A | * | 5/1993 | Spadaccini | F02M 27/02 60/780 |
| 5,479,898 A | * | 1/1996 | Cullen | F02P 5/045 123/350 |
| 5,657,625 A | * | 8/1997 | Koga | F01N 3/0885 60/274 |
| 6,216,450 B1 | * | 4/2001 | Takahashi | F01N 3/0842 60/276 |

(Continued)

*Primary Examiner* — Gonzalo Laguarda
(74) *Attorney, Agent, or Firm* — Geoffrey Brumbaugh; McCoy Russell LLP

(57) ABSTRACT

Methods and systems are provided for increasing a temperature of a catalyst of an engine by operating the engine in a split lambda catalyst heating mode. In one example, a method may include, while operating an engine in a split lambda catalyst heating mode, adjusting a magnitude of a lambda split between a rich set of combustion events and a lean set of combustion events based on soot formation in the rich set of combustion events. In this way, catalyst temperature may be increased while maintaining engine efficiency and preventing soot formation in the cylinders.

18 Claims, 6 Drawing Sheets

(56) References Cited

U.S. PATENT DOCUMENTS

| | | | |
|---|---|---|---|
| 6,691,507 B1* | 2/2004 | Meyer | F01N 11/002 |
| | | | 60/285 |
| 6,868,667 B2 | 3/2005 | Surnilla | |
| 7,356,988 B2 | 4/2008 | Pott et al. | |
| 7,975,471 B2 | 7/2011 | Miyashita | |
| 8,112,218 B2 | 2/2012 | Russ | |
| 8,225,594 B2* | 7/2012 | Kaneko | F01N 3/0885 |
| | | | 60/277 |
| 8,402,747 B2 | 3/2013 | Zillmer et al. | |
| 8,443,587 B2* | 5/2013 | Narayanaswamy | |
| | | | F02D 41/0082 |
| | | | 60/285 |
| 9,297,320 B2* | 3/2016 | Hilditch | F02M 26/05 |
| 10,174,699 B2 | 1/2019 | Suzuki et al. | |
| 10,871,140 B1* | 12/2020 | Christensen | F02P 5/1504 |
| 10,989,125 B2* | 4/2021 | Kido | F02D 37/02 |
| 2020/0277910 A1* | 9/2020 | Miyazaki | F02D 41/1448 |

* cited by examiner

SYSTEMS AND METHODS FOR SPLIT LAMBDA CATALYST HEATING

FIELD

The present description relates generally to methods and systems for controlling a vehicle engine to increase a temperature of a catalyst.

BACKGROUND/SUMMARY

An internal combustion engine combusts an air-fuel mixture within cylinders to produce torque, which may be used to propel a vehicle. After combustion, exhaust gases may flow through a vehicle exhaust system. A catalyst, such as a three-way catalyst, a selective catalytic reduction (SCR) device, or the like, may be included in the vehicle exhaust system in order to reduce emissions generated by engine operation. However, catalyst operation may be degraded when an exhaust gas temperature is low relative to a nominal operating temperature, such as after an engine cold start or during low load operations when the exhaust gas temperature decreases. In particular, the catalyst may not operate efficiently beneath a threshold operating temperature (e.g., a catalyst light off temperature). As an example, a relatively large percentage of vehicle emissions may occur in a short interval after a cold start but before the catalyst light off temperature is reached. As another example, vehicle emissions may increase during low load operation due to low catalyst temperature.

Frequently, retarded spark timing (also referred to herein as "spark retard") is used to increase the exhaust gas temperature. For example, after a cold start and/or during low load operation, spark timing for the engine may be retarded relative to the spark timing for maximum brake torque (MBT), which may increase a combustion temperature, so that the exhaust gas temperature increases. Increasing the exhaust gas temperature may increase the catalyst temperature.

However, the inventors herein have recognized potential issues with such systems. As one example, operating with spark retard may decrease engine efficiency. For example, retarding spark timing relative to MBT decreases an amount of torque produced by combusting an air-fuel mixture. Further, hot exhaust produced by operating with spark retard may cool before arriving at the catalyst. For example, the catalyst may be downstream of a turbocharger turbine, and hot exhaust from the cylinders may lose thermal energy while traveling through the turbocharger turbine. As such, robust methods for increasing the catalyst temperature without decreasing engine efficiency are desired.

In one example, the issues described above may be addressed by a method for, while operating an engine in a split lambda catalyst heating mode, adjusting a magnitude of a lambda split between a rich set of combustion events and a lean set of combustion events based on soot formation in the rich set of combustion events and lean combustion tolerance in the lean set of combustion events. In this way, a temperature of a catalyst may be increased while maintaining global stoichiometry, without a decrease in engine efficiency relative to nominal operation.

As one example, operating in the split lambda catalyst heating mode may include selecting a cylinder pattern, advancing spark timing for the lean set of cylinders more than spark timing for the rich set of cylinders, and operating the rich set of cylinders with a rich air-fuel ratio (AFR) and the lean set of cylinders with a lean AFR, the rich AFR and the lean AFR determined based on the lambda split, exhaust gas from both the rich set of cylinders and the lean set of cylinders producing a stoichiometric air-fuel ratio at the catalyst. For example, based on the lambda split, the controller may enlean the lean set of cylinders while enriching the rich set of cylinders, such that the exhaust gas from the rich cylinder set and the lean cylinder set is globally stoichiometric. Further, due to the lambda split, the globally stoichiometric exhaust includes excess oxygen ($O_2$) from the lean cylinder set and excess CO and $H_2$ from the rich cylinder set. The magnitude of the lambda split may be further based on a desired amount of catalyst heating, operating in the split lambda catalyst heating mode may be responsive to a catalyst front face temperature being above a threshold catalyst front face temperature and a catalyst midbed temperature being below a threshold catalyst midbed temperature. Therefore, when excess $O_2$, CO, and $H_2$ from the globally stoichiometric exhaust reach the catalyst and the catalyst front face temperature exceeds the threshold catalyst front face temperature, the excess $O_2$, CO, and $H_2$ may react exothermically, providing catalyst heating.

As another example, selecting the cylinder pattern may include determining which of the cylinders of the engine comprise the rich set of cylinders and which of the cylinders of the engine comprise the lean set of cylinders, based on an estimated catalyst washcoat storage capacity for the catalyst. For example, the estimated catalyst washcoat storage capacity is based on a catalyst age, a catalyst type, and a catalyst temperature, and the estimated catalyst washcoat storage capacity includes at least one of an estimated catalyst washcoat oxygen storage capacity, an estimated catalyst washcoat hydrogen storage capacity, and an estimated catalyst washcoat hydrocarbon storage capacity. Further, the cylinder pattern may describe which cylinders in a cylinder firing order are commanded lean and which cylinders in a firing order are commanded rich, while operating in the split lambda catalyst heating mode. For example, if the estimated catalyst washcoat oxygen storage capacity is high, the cylinder pattern may include several lean cylinders firing consecutively.

As another example, operating the rich set of cylinders with the rich AFR and the lean set of cylinders with the lean AFR may include injecting fuel with early injection timing in the rich set of cylinders, relative to the injection timing for the lean set of cylinders, and performing split fuel injection in the lean set of cylinders, wherein performing split fuel injection in the lean set of cylinders includes: for each cylinder in the lean set of cylinders, injecting a first amount of fuel during an intake stroke of the cylinder; and for each cylinder in the lean set of cylinders, injecting a second amount of fuel during a compression stroke of the cylinder prior to spark plug actuation. For example, the controller may inject an amount of fuel into the rich set of cylinders early in each cylinder cycle, such as during an intake stroke of the cylinder. Further, the controller may inject split the amount of fuel for each lean cylinder between a first injection during the intake stroke and a second injection during the compression stroke. By performing split fuel injection in the lean cylinder set, the air-fuel mixture in the lean cylinders may be stratified, such that the air-fuel mixture is substantially rich near the spark plug. Further, by injecting fuel early in the rich cylinder set, the air-fuel mixture in the rich cylinder set may be well-mixed. Thus, by providing catalyst heating via operating in the split lambda catalyst heating mode, the catalyst temperature may be increased and engine efficiency may also be increased relative to operating with spark retard. Further, because heat is generated at the catalyst front face, thermal energy is not lost as exhaust moves through the exhaust system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
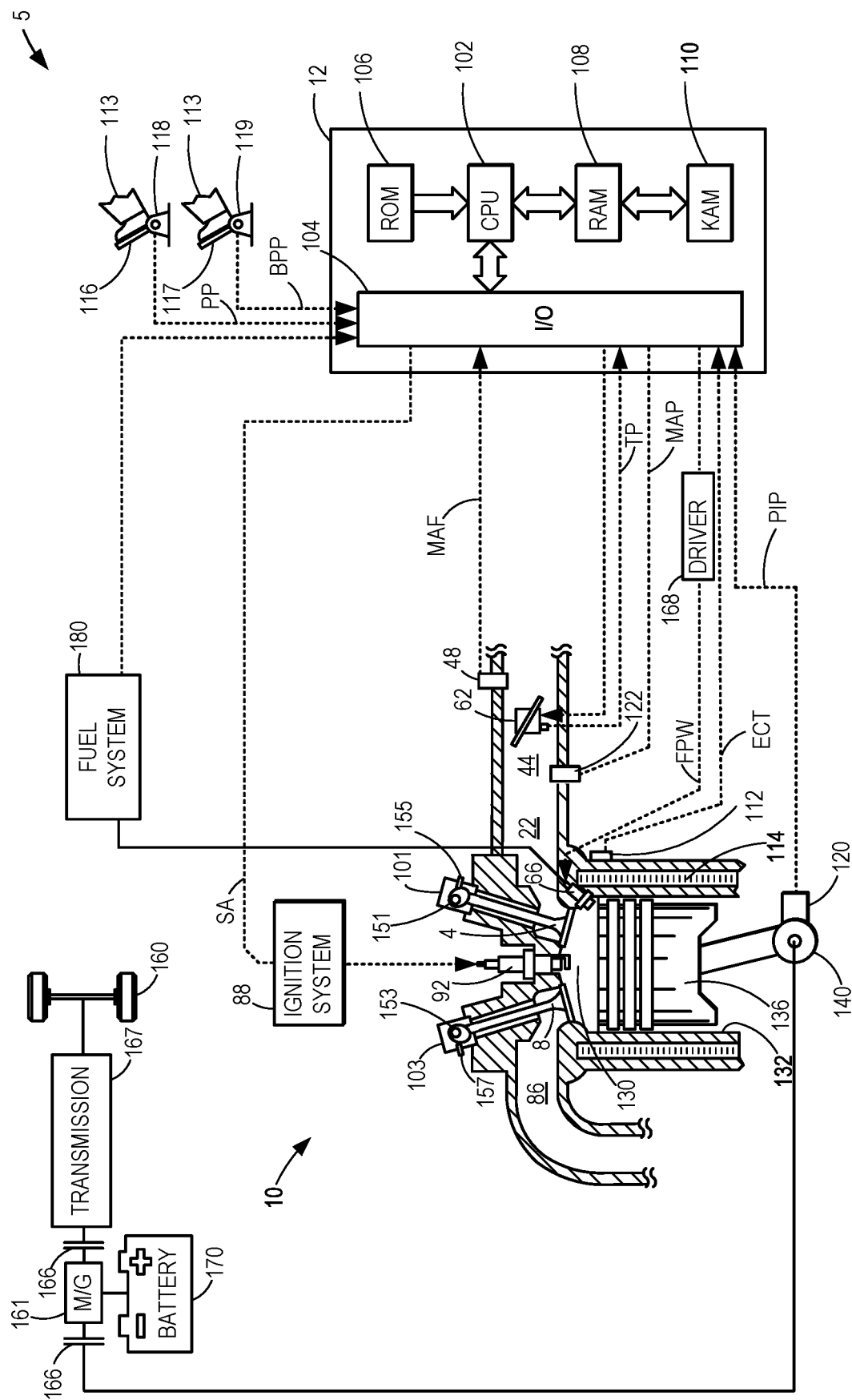
FIG. 1 shows a schematic depiction of a cylinder configuration in an engine system of a vehicle.
Figure 5:
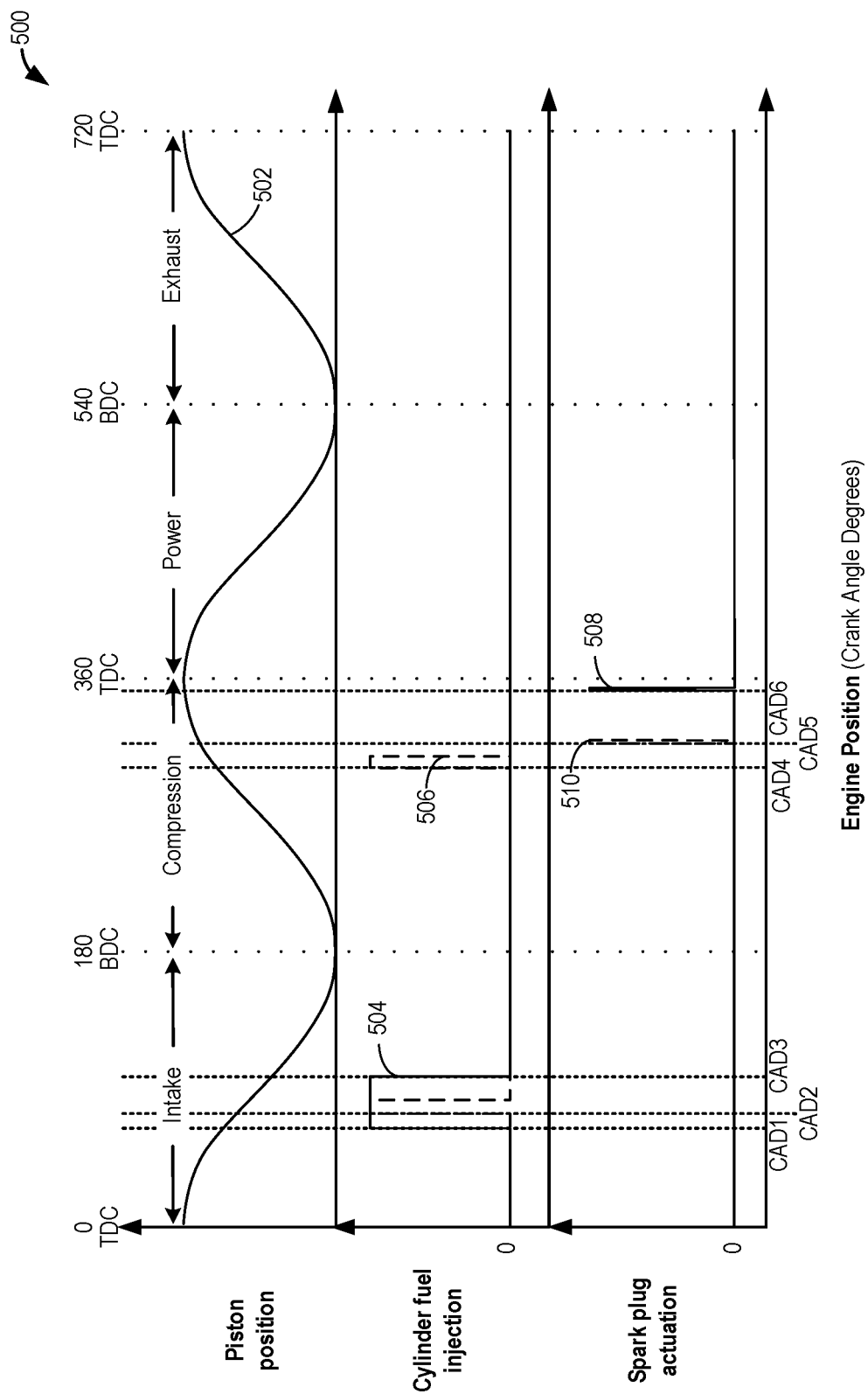
FIG. 5 shows example spark and fuel injection timings for a first, rich cylinder and a second, lean cylinder while operating in the split lambda catalyst heating mode.
Figure 6:
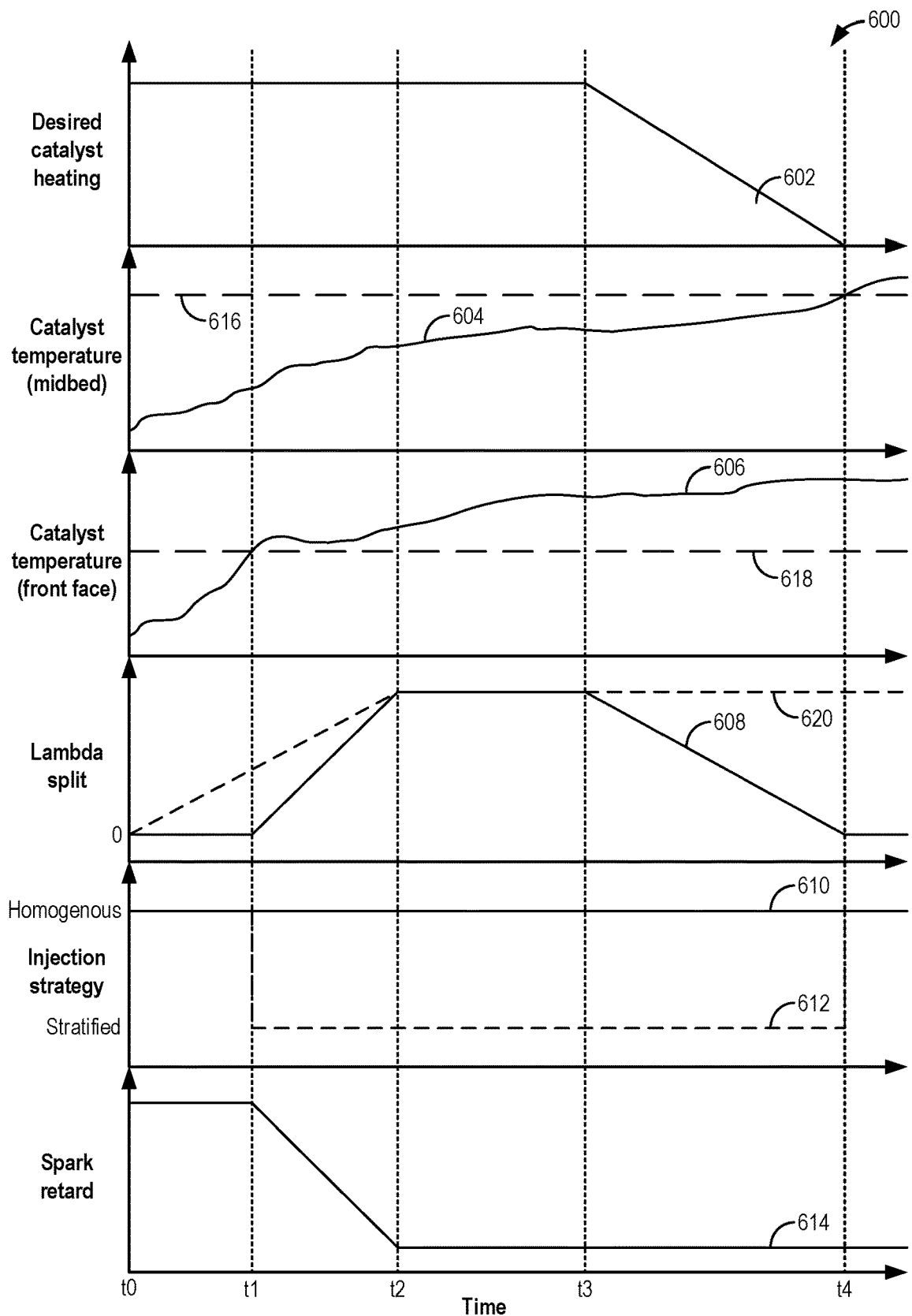
FIG. 6 shows a prophetic example timeline for operating an engine system in the split lambda catalyst heating mode to increase a temperature of a catalyst.

The following description relates to systems and methods for providing catalyst heating by operating an engine system in a split lambda catalyst heating mode. The engine system may include various multi-cylinder configurations, such as the example engine system configuration shown in FIG. 2, and each cylinder of the engine may have a cylinder configuration, such as shown in FIG. 1. Further, a controller may adjust cylinder fueling and cylinder spark timing in order to increase a temperature of a catalyst by operating in the split lambda catalyst heating mode, such as according to the method of FIG. 3. In particular, operating in the split lambda catalyst heating mode includes operating a first set of cylinders with an air-fuel ratio (AFR) rich relative to stoichiometry (e.g., a set of rich cylinders) while operating a second set of cylinders with an AFR lean relative to stoichiometry (e.g., a set of lean cylinders). While operating in the split lambda catalyst heating mode, the controller may select a cylinder pattern, such as one of the cylinder patterns shown in FIGS. 4A-4F, based on an estimated catalyst washcoat storage capacity. For example, the controller may assign each cylinder of the engine to one of the rich set of cylinders and the lean set of cylinders based on the selected cylinder pattern. Further, the controller may change the selected cylinder pattern as the estimated catalyst washcoat storage capacity changes. FIG. 5 shows example cylinder fueling and spark timing for a rich cylinder and a lean cylinder while operating in the split lambda catalyst heating mode. Further, a prophetic example timeline for operating the engine to provide a desired amount of catalyst heating to a catalyst by operating in the split lambda catalyst heating mode is shown in FIG. 6.

Turning now to the figures, FIG. 1 shows a partial view of a single cylinder 130 of an internal combustion engine 10 that may be included in a vehicle 5. Internal combustion engine 10 may be a multi-cylinder engine, one example configuration of which will be described below with respect to FIG. 2. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust port 86 via exhaust valve 8.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate exhaust valve 8 such that it remains closed and does not open at its set timing. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. An ignition system 88 can provide an ignition spark to combustion chamber 130 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 130 is shown including one fuel injector 66. Fuel injector 66 is shown coupled directly to combustion chamber 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. While FIG. 1 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to increase mixing. In another example, injector 66 may be a port injector providing fuel into the intake port upstream of cylinder 130.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed. Controller 12 may receive various signals from sensors coupled to engine 10, in addition to those signals previously discussed, including a measurement of inducted mass air flow (MAF) from mass air flow sensor 48, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) from a throttle position sensor coupled to a throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, spark plug 92, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 3.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Figure 2:
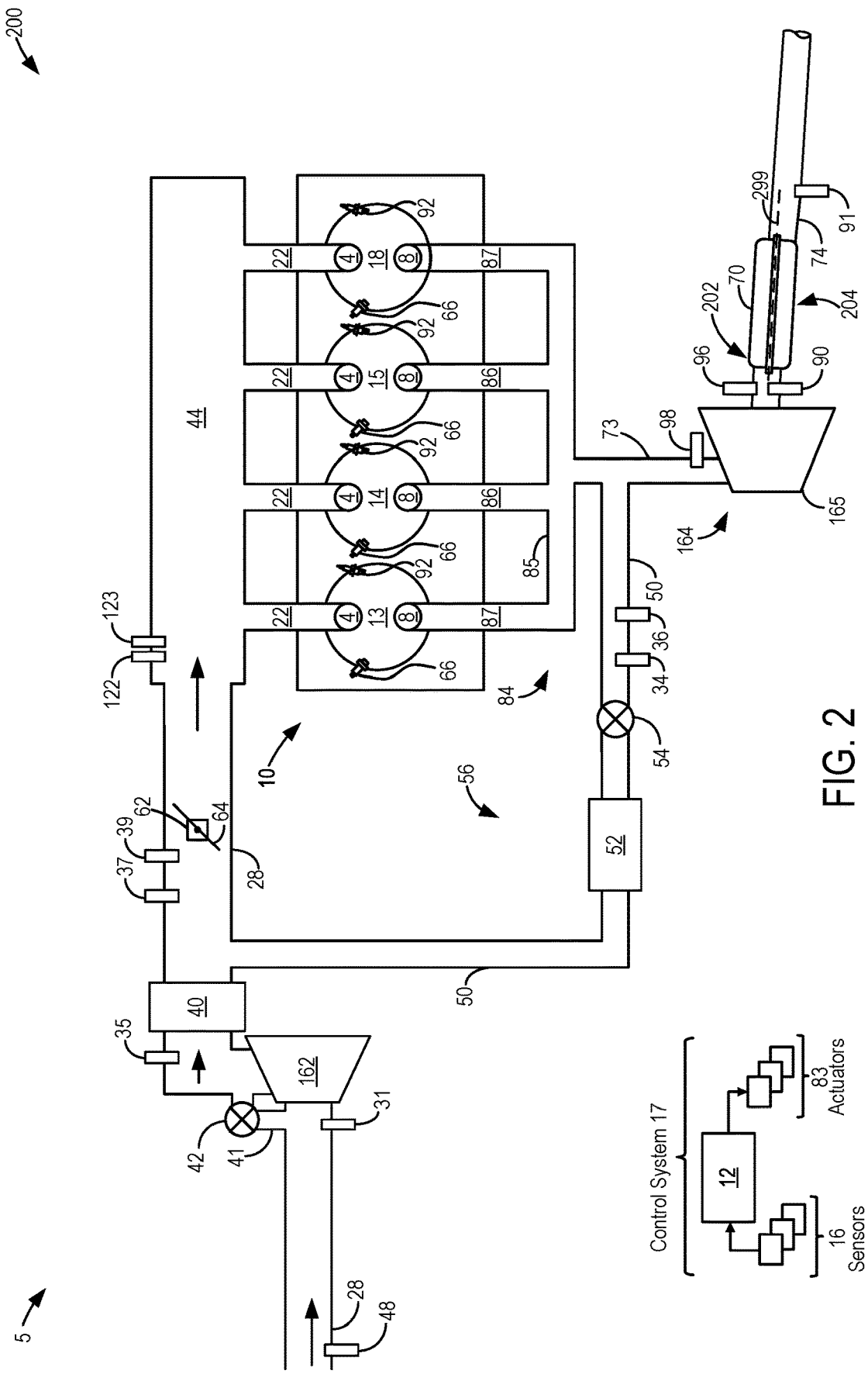
FIG. 2 shows a schematic depiction of the engine system in FIG. 1.

As mentioned above, FIG. 1 shows one cylinder of multi-cylinder engine 10. Referring now to FIG. 2, a schematic diagram of an example engine system 200 is shown, which may be included in the propulsion system of vehicle 5 of FIG. 1. For example, engine system 200 provides one example engine configuration of engine 10 introduced in FIG. 1. As such, components previously introduced in FIG. 1 are represented with the same reference numbers and are not reintroduced. In the example shown in FIG. 2, engine 10 includes cylinders 13, 14, 15, and 18, arranged in an inline-4 configuration, although other engine configurations are also possible (e.g., I-3, V-4, I-6, V-8, V-12, opposed 4, and other engine types). Thus, the number of cylinders and the arrangement of the cylinders may be changed without parting from the scope of this disclosure. The engine cylinders may be capped on the top by a cylinder head. Cylinders 14 and 15 are referred to herein as the inner (or inside) cylinders, and cylinders 13 and 18 are referred to herein as the outer (or outside) cylinders. The cylinders shown in FIG. 2 may each have a cylinder configuration, such as the cylinder configuration described above with respect to FIG. 1.

Each of cylinders 13, 14, 15, and 18 includes at least one intake valve 4 and at least one exhaust valve 8. The intake and exhaust valves may be referred to herein as cylinder intake valves and cylinder exhaust valves, respectively. As explained above with reference to FIG. 1, a timing (e.g., opening timing, closing timing, opening duration, etc.) of each intake valve 4 and each exhaust valve 8 may be controlled via various valve timing systems.

Each cylinder receives intake air (or a mixture of intake air and recirculated exhaust gas, as will be elaborated below) from intake manifold 44 via an air intake passage 28. Intake manifold 44 is coupled to the cylinders via intake ports (e.g., runners) 22. In this way, each cylinder intake port can selectively communicate with the cylinder it is coupled to via a corresponding intake valve 4. Each intake port may supply air, recirculated exhaust gas, and/or fuel to the cylinder it is coupled to for combustion.

As described above with respect to FIG. 1, a high pressure fuel system may be used to generate fuel pressures at the fuel injector 66 coupled to each cylinder. For example, controller 12 may inject fuel into each cylinder at a different timing such that fuel is delivered to each cylinder at an appropriate time in an engine cycle. As used herein, "engine cycle" refers to a period during which each engine cylinder fires once in a designated cylinder firing order. A distributorless ignition system may provide an ignition spark to cylinders 13, 14, 15, and 18 via the corresponding spark plug 92 in response to the signal SA from controller 12 to initiate combustion. A timing of the ignition spark may be individually adjusted for each cylinder or for a group of cylinders, as will be further described below with respect to FIG. 3.

Inside cylinders 14 and 15 are each coupled to an exhaust port (e.g., runner) 86 and outside cylinders 13 and 18 are each coupled to an exhaust port 87 for channeling combustion exhaust gases to an exhaust system 84. Each exhaust port 86 and 87 can selectively communicate with the cylinder it is coupled to via the corresponding exhaust valve 8. Specifically, as shown in FIG. 2, cylinders 14 and 15 channel exhaust gases to an exhaust manifold 85 via exhaust ports 86, and cylinders 13 and 18 channel exhaust gases to the exhaust manifold 85 via exhaust ports 87. Thus, engine system 200 includes a single exhaust manifold that is coupled to every cylinder of the engine Engine system 200 further includes a turbocharger 164, including a turbine 165 and an intake compressor 162 coupled on a common shaft (not shown). In the example shown in FIG. 2, turbine 165 is fluidically coupled to exhaust manifold 85 via a first exhaust passage 73. Turbine 165 may be a monoscroll turbine or a dual scroll turbine, for example. Rotation of turbine 165 drives rotation of compressor 162, disposed within intake passage 28. As such, the intake air becomes boosted (e.g., pressurized) at the compressor 162 and travels downstream to intake manifold 44. Exhaust gases exit turbine 165 into a second exhaust passage 74.

In some examples, a wastegate may be coupled across turbine 165 (not shown). Specifically, a wastegate valve may be included in a bypass coupled between first exhaust passage 73, upstream of an inlet of turbine 165, and second exhaust passage 74, downstream of an outlet of turbine 165. The wastegate valve may control an amount of exhaust gas flowing through the bypass and to the outlet of turbine. For example, as an opening of the wastegate valve increases, an amount of exhaust gas flowing through the bypass and not through turbine 165 may increase, thereby decreasing an amount of power available for driving turbine 165 and compressor 162. As another example, as the opening of the wastegate valve decreases, the amount of exhaust gas flowing through the bypass decreases, thereby increasing the amount of power available for driving turbine 165 and compressor 162. In this way, a position of the wastegate valve may control an amount of boost provided by turbocharger 164. In other examples, turbine 165 may be a variable geometry turbine (VGT) including adjustable vanes to change an effective aspect ratio of turbine 165 as engine operating conditions change to provide a desired boost pressure. Thus, increasing the speed of turbocharger 164, such as by further closing the wastegate valve or adjusting turbine vanes, may increase the amount of boost provided, and decreasing the speed of turbocharger 164, such as by further opening the wastegate valve or adjusting the turbine vanes, may decrease the amount of boost provided.

First exhaust passage 73 further includes an exhaust temperature (EGT) sensor 98. In the example shown in FIG. 2, EGT sensor 98 is located upstream of turbine 165, such as near the inlet of turbine 165. As such, EGT sensor 98 may be configured to measure a temperature of exhaust gases entering turbine 165. In some examples, an output of EGT sensor 98 may be used by controller 12 to determine a turbine inlet temperature.

After exiting turbine 165, exhaust gases flow downstream in second exhaust passage 74 to a catalyst 70. Catalyst 70 may include one or more catalysts, such as one or more catalyst bricks and/or one or more particulate filters. For example, catalyst 70 may include a three-way catalyst configured to chemically reduce nitrogen oxides (NOx) and oxidize carbon monoxide (CO) and hydrocarbons (HC). In some examples, catalyst 70 may additionally or alternatively include a gasoline particulate filter (GPF). After passing through catalyst 70, exhaust gases may be directed out to a tailpipe. As an example, the three-way catalyst may be maximally effective at treating exhaust gas with a stoichiometric air-fuel ratio (AFR), as will be elaborated below.

Further, the three-way catalyst may have a catalyst washcoat, including a refractory oxide layer bonded to the catalyst structure, in order to increase a surface area for dispersion of catalytic metals. The catalyst washcoat may reduce an incidence of undesired reactions between catalyst components and exhaust gases. As an example, a catalyst washcoat may include at least one of aluminum oxide, silicon oxide, zeolites, etc. During catalyst operation, the catalyst washcoat may increase adsorption of exhaust gas components such as oxygen (e.g., $O_2$) and unburnt HC. In particular, the catalyst washcoat may have an oxygen storage capacity and a HC storage capacity. However, the storage capacities of the catalyst washcoat may vary based on catalyst age, washcoat material, and engine operating conditions such as catalyst temperature. As an example, a catalyst with a new catalyst washcoat may have a higher oxygen storage capacity relative to a catalyst with an older catalyst washcoat. As another example, a catalyst including zeolites may have a higher hydrocarbon storage capacity relative to a catalyst without zeolites. Further, catalyst 70 may have a front face 202 and a midbed 204. For example, the catalyst front face 202 may be a surface of the catalyst disposed proximate to an inlet of the catalyst. As such, as exhaust enters the catalyst, it first passes through the catalyst front face. The catalyst midbed 204 may be located downstream of the catalyst front face 202 with respect to the flow of exhaust, along an axial length of the catalyst, such as along catalyst axis 299. For example, the catalyst front face 202 is upstream of the catalyst midbed 204, such that the catalyst front face 202 is closer to the turbine 165 than the catalyst midbed 204. For example, determining a catalyst front face temperature may include estimating a temperature at the catalyst front face, while determining a catalyst midbed temperature may include estimating a temperature at the catalyst midbed. Second exhaust passage 74 further includes a plurality of exhaust sensors in electronic communication with controller 12, which is included in a control system 17. As shown in FIG. 2, second exhaust passage 74 includes a first oxygen sensor 90 positioned upstream of catalyst 70. First oxygen sensor 90 may be configured to measure an oxygen content of exhaust gas entering catalyst 70. Second exhaust passage 74 may include one or more additional oxygen sensors positioned along second exhaust passage 74, such as a second oxygen sensor 91 positioned downstream of catalyst 70. As such, second oxygen sensor 91 may be configured to measure the oxygen content of the exhaust gas exiting catalyst 70. In one example, one or more of oxygen sensor 90 and oxygen sensor 91 may be a universal exhaust gas oxygen (UEGO) sensor. Alternatively, a two-state exhaust gas oxygen sensor may be substituted for at least one of oxygen sensors 90 and 91. Second exhaust passage 74 may include various other sensors, such as one or more temperature and/or pressure sensors. For example, as shown in FIG. 2, an exhaust gas temperature sensor 96 is positioned within second exhaust passage 74 upstream of catalyst 70. As such, exhaust gas temperature sensor 96 may be configured to measure the temperature of exhaust gas entering catalyst 70.

First exhaust passage 73 is coupled to an exhaust gas recirculation (EGR) passage 50 included in an EGR system 56. EGR passage 50 fluidically couples exhaust manifold 85 to intake passage 28, downstream of compressor 162. As such, exhaust gases are directed from first exhaust passage 73 to air intake passage 28, downstream of compressor 162, via EGR passage 50, which provides high-pressure EGR. However, in other examples, EGR passage 50 may be coupled to intake passage 28 upstream of compressor 162.

As shown in FIG. 2, EGR passage 50 may include an EGR cooler 52 configured to cool exhaust gases flowing from first exhaust passage 73 to intake passage 28 and may further include an EGR valve 54 disposed therein. Controller 12 is configured to actuate and adjust a position of EGR valve 54 in order to control a flow rate and/or amount of exhaust gases flowing through EGR passage 50. When EGR valve 54 is in a closed (e.g., fully closed) position, no exhaust gases may flow from first exhaust passage 73 to intake passage 28. When EGR valve 54 is in an open position (e.g., from partially open to fully open), exhaust gases may flow from first exhaust passage 73 to intake passage 28. Controller 12 may adjust the EGR valve 54 into a plurality of positions between fully open and fully closed. In other examples, controller 12 may adjust EGR valve 54 to be either fully open or fully closed. Further, in some examples, a pressure sensor 34 may be arranged in EGR passage 50 upstream of EGR valve 54.

As shown in FIG. 2, EGR passage 50 is coupled to intake passage 28 downstream of a charge air cooler (CAC) 40. CAC 40 is configured to cool intake air as it passes through CAC 40. In an alternative example, EGR passage 50 may be coupled to intake passage 28 upstream of CAC 40 (and downstream of compressor 162). In some such examples, EGR cooler 52 may not be included in EGR passage 50, as CAC cooler 40 may cool both the intake air and recirculated exhaust gases. EGR passage 50 may further include an oxygen sensor 36 disposed therein and configured to measure an oxygen content of exhaust gases flowing through EGR passage 50 from first exhaust passage 73. In some examples, EGR passage 50 may include additional sensors, such as temperature and/or humidity sensors, to determine a composition and/or quality of the exhaust gas being recirculated to intake passage 28 from exhaust manifold 85.

Intake passage 28 further includes throttle 62. As shown in FIG. 2, throttle 62 is positioned downstream of CAC 40 and downstream of where EGR passage 50 couples to intake passage 28 (e.g., downstream of a junction between EGR passage 50 and intake passage 28). A position of a throttle plate 64 of throttle 62 may be adjusted by controller 12 via a throttle actuator (not shown) communicatively coupled to controller 12. By modulating throttle 62 while operating compressor 162, a desired amount of fresh air and/or recirculated exhaust gas may be delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from a compressor outlet, upstream of CAC 40, to a compressor inlet. A compressor recirculation valve (CRV) 42 may be provided for adjusting an amount of flow recirculated to the compressor inlet. In one example, CRV 42 may be actuated open via a command from controller 12 in response to actual or expected compressor surge conditions.

Intake passage 28 may include one or more additional sensors (such as additional pressure, temperature, flow rate, and/or oxygen sensors). For example, as shown in FIG. 2, intake passage 28 includes MAF sensor 48 disposed upstream of compressor 162 in intake passage 28. An intake pressure and/or temperature sensor 31 is also positioned in intake passage 28 upstream of compressor 162. An intake oxygen sensor 35 may be located in intake passage 28 downstream of compressor 162 and upstream of CAC 40. An additional intake pressure sensor 37 may be positioned in intake passage 28 downstream of CAC 40 and upstream of throttle 62 (e.g., a throttle inlet pressure sensor). In some examples, as shown in FIG. 2, an additional intake oxygen sensor 39 may be positioned in intake passage 28 between CAC 40 and throttle 62, downstream of the junction between EGR passage 50 and intake passage 28. Further, MAP sensor 122 and an intake manifold temperature sensor 123 are shown positioned within intake manifold 44, upstream of the engine cylinders.

Engine 10 may be controlled at least partially by control system 17, including controller 12, and by input from the vehicle operator (as described above with respect to FIG. 1). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, first exhaust passage 73, second exhaust passage 74, and EGR passage 50, as described above. Other sensors may include a throttle inlet temperature sensor for estimating a throttle air temperature (TCT) coupled upstream of throttle 62 in the intake passage. Further, it should be noted that engine 10 may include all or a portion of the sensors shown in FIG. 2. As another example, actuators 83 may include fuel injectors 66, throttle 62, CRV 42, EGR valve 54, and spark plugs 92. Actuators 83 may further include various camshaft timing actuators coupled to the cylinder intake and exhaust valves (as described above with reference to FIG. 1). Controller 12 may receive input data from the various sensors, process the input data, and trigger the actuators in response to the processed input data based on instruction or code programmed in a memory of controller 12 corresponding to one or more routines. For example, controller 12 may provide catalyst heating according to the example method (e.g., routine) of FIG. 3.

Engine system 200, as well as additional engine system configurations not explicitly illustrated, may be operated with a split lambda fueling strategy. The split lambda fueling (also referred to herein as operating in a split lambda mode) includes operating a first set (or number) of cylinders at a first, rich AFR and a second (e.g., remaining) set (or number) of the engine cylinders at a second, lean AFR while maintaining stoichiometry at the catalyst (e.g., catalyst 70 of FIG. 2). For example, the catalyst may be a three-way catalyst. Lambda ($\lambda$) may be a ratio of an operating AFR to a stoichiometric AFR. For example, a stoichiometric cylinder may operate with a lambda value of approximately one (e.g., $\lambda=0.96$ to $1.04$). A rich feed ($\lambda<1$) results from air-fuel mixtures with more fuel relative to stoichiometry. For example, when a cylinder is enriched, more fuel is supplied to the cylinder than for producing a complete combustion reaction with an amount of air in the cylinder, resulting in excess, unreacted fuel. In contrast, a lean feed ($\lambda>1$) results from air-fuel mixtures with less fuel relative to stoichiometry. For example, when a cylinder is enleaned, less fuel is delivered to the cylinder than for producing a complete combustion reaction with the amount of air in the cylinder, resulting in excess, unreacted air.

As an example of operating with split lambda fueling, the first set of cylinders may be operated at a rich AFR having a lambda value ($\lambda$) in a range from 0.95-0.8 (e.g., 5-20% rich), which is richer than a nominal fluctuation about stoichiometry. The second set of cylinders may be operated at a corresponding lean lambda value (e.g., in a range from 1.05 to 1.2) to maintain overall stoichiometry at the catalyst. For example, a degree of enleanment of the second set of cylinders may be selected based on a degree of enrichment of the first set of cylinders so that the exhaust gas from the first set of cylinders may mix with the exhaust gas from the second set of cylinders to form an approximately stoichiometric mixture, even while none of the cylinders are operated at stoichiometry. Further, the split rich and lean operation may be maintained over a plurality of engine cycles, as will be elaborated below. A difference between the rich lambda value and the lean lambda value may be referred to herein as a lambda split.

While operating an engine system, such as engine system 200 of FIG. 2, with a lambda split, exhaust from the first (e.g., enriched) set of cylinders may contain carbon monoxide (CO) and hydrogen ($H_2$), while exhaust from the second (e.g., enleaned) set of cylinders may contain excess oxygen ($O_2$). When exhaust from the first set of the cylinders and exhaust from the second set of cylinders reach the catalyst, the CO, and $H_2$ may produce an exothermic reaction with the excess $O_2$, thus generating heat and increasing a temperature of a catalyst (e.g., emission control device 70 of FIG. 2). In this way, operating with a lambda split may increase a catalyst temperature after a cold start and/or during light load operation.

Relative to catalyst heating via spark retard, catalyst heating via a lambda split may be more fuel efficient because energy is transferred from the engine to the catalyst in a chemical form (versus a thermal form), preventing heat losses. However, operating with the lambda split may influence other engine operating conditions, such as an amount of torque provided and combustion qualities in the cylinder. Further, when the lambda split is high, soot formation may occur in the rich cylinder set, which may cause fouling.

Figure 3:
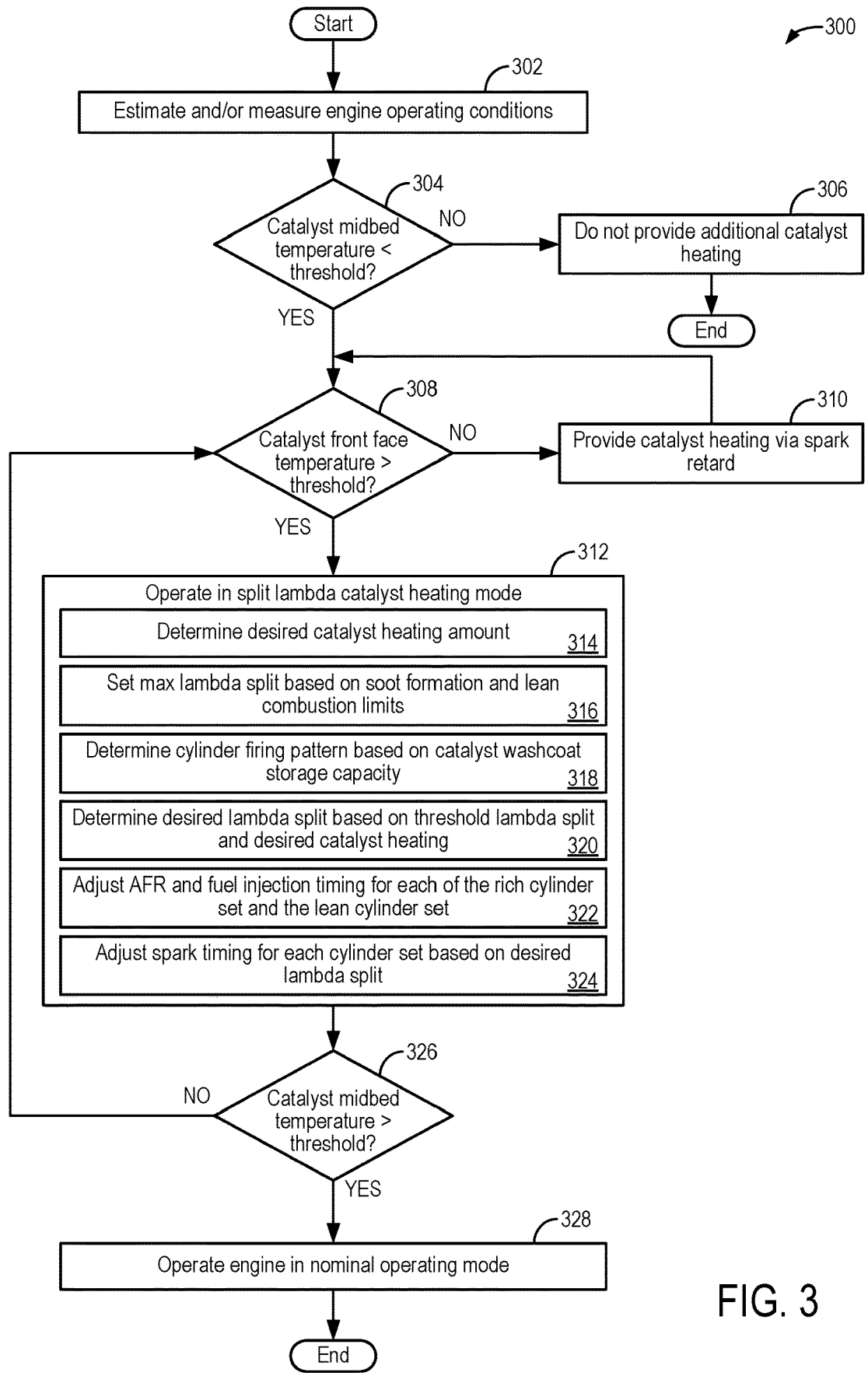
FIG. 3 shows an example method for operating an engine in a split lambda catalyst heating mode to increase a temperature of a catalyst.

Therefore, FIG. 3 provides an example method 300 for increasing a temperature of a catalyst (e.g., emission control device 70 of FIG. 2) by operating in a split lambda catalyst heating mode without negatively affecting vehicle performance. Instructions for carrying out method 300 and the rest of the methods included herein may be executed by a controller (e.g., controller 12 of FIGS. 1 and 2) based on instructions stored on a memory of the controller and in conjunction with signals received from sensors of the engine system, such as the sensors described above with reference to FIGS. 1 and 2, including a signal received from the exhaust gas temperature sensor. The controller may employ engine actuators of the engine system to adjust engine operation, such as by adjusting a spark timing of a spark provided via a spark plug (e.g., spark plug 92 of FIGS. 1 and 2) and a timing of a fuel injector (e.g., fuel injector 66 of FIGS. 1 and 2), according to the methods described below.

At 302, method 300 includes estimating and/or measuring operating conditions. The operating conditions may include, for example, vehicle speed, engine speed, engine load, cylinder AFR, a catalyst front face temperature, a catalyst midbed temperature, engine temperature, an accelerator pedal position, a brake pedal position, a throttle position, and exhaust gas temperature. The operating conditions may be measured by one or more sensors communicatively coupled to the controller or may be inferred based on available data. For example, the controller may estimate the engine load by inputting a throttle position and a mass air flow (MAF) sensor reading into one or more look-up tables, maps, or functions, which may output engine load. As another example, the exhaust gas temperature may be measured by an exhaust gas temperature sensor positioned upstream of the catalyst and downstream of a turbocharger turbine, such as exhaust gas temperature sensor 96 of FIG. 2. Further, the controller may estimate the catalyst midbed temperature (e.g., a temperature at the catalyst midbed) and the catalyst front face temperature (e.g., a temperature at the catalyst front face) by inputting the engine operating conditions, including the exhaust gas temperature and the engine temperature, into one or more look-up tables, maps, or functions, which may output the catalyst midbed temperature and the catalyst front face temperature. As another example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque.

At 304, method 300 includes determining whether the catalyst midbed temperature is below a threshold catalyst midbed temperature. For example, the threshold catalyst midbed temperature may be a positive, non-zero catalyst midbed temperature value below which the catalyst may not efficiently reduce vehicle emissions. For example, when the catalyst midbed temperature is below the threshold catalyst midbed temperature, an amount of catalyst heating may be requested to increase the temperature of a catalyst. As an example, increasing the temperature of the catalyst may decrease vehicle emissions by increasing catalyst efficiency.

If the controller determines that the catalyst midbed temperature is not below the threshold catalyst midbed temperature (e.g., the catalyst midbed temperature exceeds the threshold catalyst midbed temperature) at 304, method 300 proceeds to 306, and includes not providing additional catalyst heating. For example, when the catalyst midbed temperature exceeds the threshold catalyst midbed temperature, the catalyst temperature may be high enough that the catalyst efficiently catalyzes vehicle exhaust gas to decrease vehicle emissions. As such, not providing catalyst heating may include operating the engine with nominal engine operating conditions, such as operating with a uniform AFR across all cylinders of the engine (e.g., operating without a lambda split), such that stoichiometric exhaust gas flows through an exhaust system to the catalyst. Not providing catalyst heating may further include operating without spark retard to increase the exhaust gas temperature. Note that exhaust gas produced while operating with each cylinder roughly stoichiometric will still produce hot exhaust gas, which may maintain or increase the catalyst temperature even while engine operation is not specifically adjusted to provide additional catalyst heating. After 306, method 300 may end.

In contrast, if the controller determines that the catalyst midbed temperature is below the threshold catalyst midbed temperature at 304, method 300 proceeds to 308 and includes determining whether the catalyst front face temperature exceeds a threshold catalyst front face temperature. The threshold catalyst front face temperature may be a positive, non-zero catalyst front face temperature value below which excess $O_2$, $H_2$, and CO (e.g., from operating in the split lambda mode) may not react exothermically to generate heat.

If the controller determines at 308 that the catalyst front face temperature does not exceed the threshold catalyst front face temperature (e.g., the catalyst front face temperature is below the threshold catalyst front face temperature), method 300 proceeds to 310 and includes providing catalyst heating via spark retard. For example, providing catalyst heating via spark retard may include retarding a spark timing of each cylinder of the engine by substantially the same amount, which may increase the exhaust gas temperature and provide heat to the catalyst. For example, the controller may determine a desired amount of spark retard for the cylinders of the engine system based on a cylinder temperature and a first desired amount of catalyst heating. The desired amount of catalyst heating while providing catalyst heating via spark retard may be a function of a difference between the threshold catalyst front face temperature and a current catalyst front face temperature. As an example, the controller may input the engine temperature and the first desired amount of catalyst heating into one or more look-up tables, maps, or functions, which may output the first desired amount of spark retard for each cylinder of the engine system. The controller may adjust the spark timing for each cylinder based on the first desired amount of spark timing for each cylinder by adjusting an actuation signal to the ignition system. Method 300 may return to 308 to continue evaluating the catalyst front face temperature while the catalyst heating is provided via spark retard. In this way, the catalyst front face temperature may be increased via spark retard until the catalyst front face is hot enough to catalyze CO and $H_2$ (e.g., the catalyst front face temperature exceeds the front face temperature threshold).

If the controller determines at 308 that the catalyst front face temperature exceeds the front face temperature threshold, method 300 proceeds to 312 and includes operating in the split lambda catalyst heating mode. Operating in the split lambda catalyst heating mode advantageously combines split lambda operation, differential fuel injection timing, and differential spark timing, in order to increase catalyst temperature without decreasing an efficiency of the engine. For example, while operating in the split lambda catalyst heating mode, a first plurality of engine cylinders is enriched relative to stoichiometry (e.g., a rich set of cylinders), and a second plurality of engine cylinders is enleaned relative to stoichiometry (e.g., a lean set of cylinders). The controller may determine which of the engine cylinders comprise the rich cylinder set and which of the engine cylinders comprise the lean cylinder set by selecting a cylinder pattern based on an estimated catalyst washcoat storage capacity. When the catalyst front face temperature exceeds the front face temperature threshold, the excess CO, $O_2$, and $H_2$ in the exhaust gas react exothermically at the catalyst front face, thus increasing the catalyst temperature. Operating in the split lambda catalyst heating mode further includes differentially adjusting spark timing and fuel injection timing for the rich cylinder set and the lean cylinder set to increase cylinder performance while balancing torque between the rich cylinder set and the lean cylinder set. In this way, the temperature of the catalyst may be increased while maintaining approximately overall stoichiometry at the catalyst.

Operating in the split lambda catalyst heating mode includes determining a desired catalyst heating amount, as indicated 314. For example, the desired catalyst heating amount may be the amount of heating desired in order to increase the catalyst midbed temperature above the threshold catalyst midbed temperature. For example, when the catalyst midbed temperature increases above the threshold catalyst midbed temperature, the catalyst may efficiently decrease vehicle emissions. The controller may determine the desired catalyst heating amount by comparing the catalyst midbed temperature to the threshold catalyst midbed temperature, for example. In an example, the controller may input the catalyst midbed temperature into one or more look-up tables, maps, or functions, which may output a desired catalyst heating amount.

Operating in the split lambda catalyst heating mode further includes setting a threshold lambda split based on soot formation, as indicated at 316. The threshold lambda split may be a non-zero amount of lambda split above which the soot formation in the rich set of cylinders (e.g., the rich AFR) exceeds a threshold soot formation. The threshold soot formation may refer to an amount of soot production above which fouling may occur and/or a downstream particulate filter may become degraded. For example, when a cylinder of the engine operates with a rich AFR, soot formation in the cylinder may increase, with the increase in the soot formation generally increasing as the rich AFR is further enriched. As such, the threshold lambda split may be determined based on a predicted amount of soot formation for the engine operating conditions, in order to maintain the soot formation in the cylinders below a threshold soot formation. In some examples, the threshold lambda split may be further adjusted based on a lean combustion tolerance in the lean set of cylinders.

For example, the controller may input the engine temperature, the engine speed, and the engine load into one or more look-up tables, maps, or functions, which may output the threshold lambda split. The threshold lambda split may be a constant value determined before operating with the lambda split, or may be actively recalculated while operating in the split lambda catalyst heating mode based on engine operating conditions. For example, as the engine cylinder surfaces warm up while operating in the split lambda catalyst heating mode, soot formation becomes less likely due to decreased wetting of the surfaces with liquid fuel, and the threshold lambda split may be increased based on the estimated increase in engine cylinder surface temperatures. As another example, the controller may determine the threshold lambda split by estimating soot formation in each cylinder of the engine, and may determine a threshold rich AFR for each rich cylinder based on the estimated soot formation for each rich cylinder and the engine temperature. For example, the controller may input an engine temperature and an estimated soot formation into one or more look-up tables, maps, or functions, which may output the threshold rich AFR for each cylinder. Further, the controller may determine the threshold lambda split by inputting the threshold rich AFR for each cylinder into one or more look-up tables, maps, or functions, which may output the threshold lambda split.

Operating in the split lambda catalyst heating mode further includes determining a cylinder pattern based on an estimated catalyst washcoat storage capacity, as indicated at 318. The cylinder pattern may define which cylinders of the engine are commanded rich and which cylinders are commanded lean while operating in the split lambda catalyst heating mode. For example, the controller may assign each cylinder of the engine to one of the rich set of cylinders and the lean set of cylinders based on the cylinder pattern. In particular, adjusting the cylinder pattern may affect a composition of the exhaust gas. For example, the controller may estimate the catalyst washcoat storage capacity based on a catalyst age, a catalyst washcoat type, and engine operating conditions such as exhaust gas temperature. The controller may input the catalyst age, the catalyst washcoat type, and an exhaust gas temperature into one or more look-up tables, maps, or functions, which may output the estimated catalyst washcoat storage capacity. Further, the catalyst washcoat storage capacity may include at least one of a catalyst washcoat oxygen storage capacity, a catalyst washcoat hydrogen storage capacity, and a catalyst washcoat hydrocarbon storage capacity. Based on the estimated catalyst washcoat storage capacity, the controller may select the cylinder pattern, as will be elaborated below. For example, the cylinder pattern may be selected from a plurality of possible cylinder patterns, such as the patterns described below with reference to FIGS. 4A-4F. Each cylinder pattern may define which cylinders of the engine comprise the rich cylinder set, and which cylinders of the engine comprise the lean cylinder set. In some examples, the controller may input the estimated catalyst washcoat storage capacity into one or more look-up tables, maps, or functions, which may output the cylinder pattern. In other examples, the controller may select a cylinder pattern based on one or more logic rules.

Figure 4A:
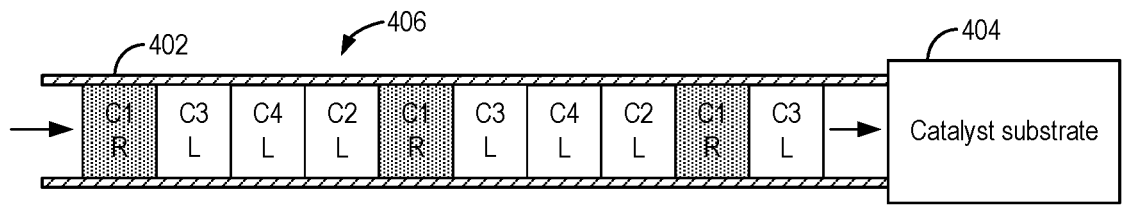
FIGS. 4A-4F show example cylinder patterns for operating in the split lambda catalyst heating mode.
Figure 4B:
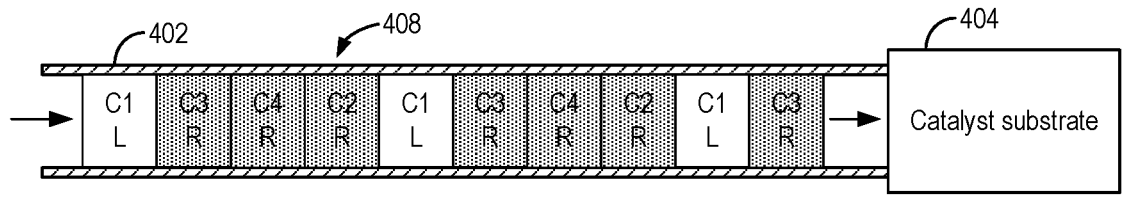
Figure 4C:
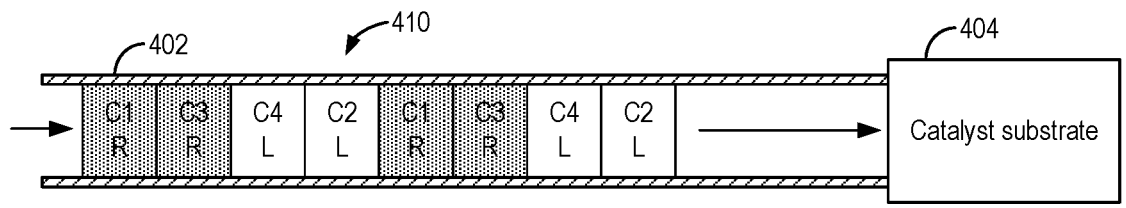
Figure 4D:
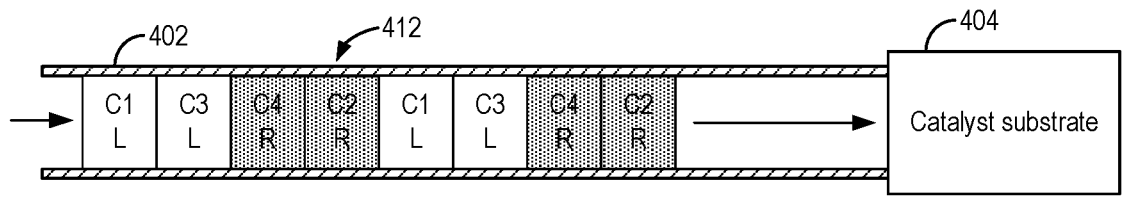
Figure 4E:
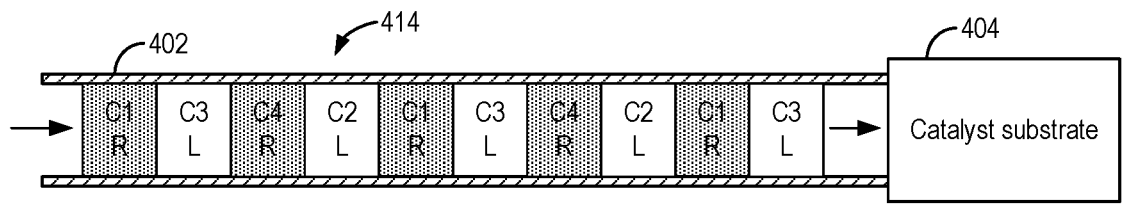
Figure 4F:
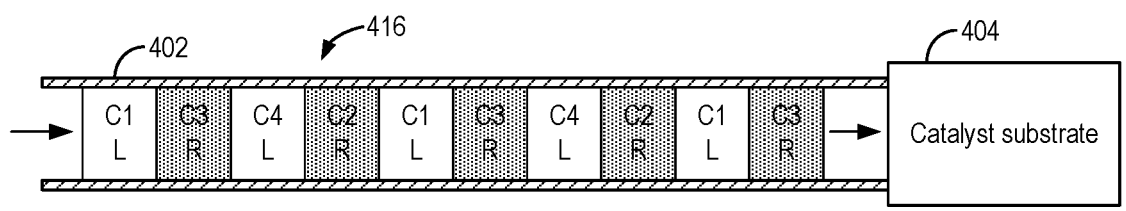

Turning briefly to FIGS. 4A-4F, several example cylinder patterns for a four-cylinder engine are shown. The cylinder patterns shown in FIGS. 4A-4F are non-limiting examples of possible cylinder patterns while operating in the split lambda catalyst heating mode. Further, FIGS. 4A-4F will be described collectively, with like components numbered the same and not reintroduced between figures. As shown in FIGS. 4A-4F, an exhaust passage 402 is fluidically coupled to a catalyst 404, such that exhaust gas flows through catalyst 404. For example, exhaust passage 402 may be first exhaust passage 73 of engine system 200 of FIG. 2, and catalyst 404 may be catalyst 70 of FIG. 2. FIG. 4A shows a first cylinder pattern 406, FIG. 4B shows a second cylinder pattern 408, FIG. 4C shows a third cylinder pattern 410, FIG. 4D shows a fourth cylinder pattern 412, FIG. 4E shows a fifth cylinder pattern 414, and FIG. 4F shows a sixth cylinder pattern 416. In each of the six cylinder patterns shown, the cylinder firing order is cylinder 1 (C1), cylinder 3 (C3), cylinder 4 (C4), cylinder 2 (C2).

Each cylinder pattern includes at least one rich cylinder (e.g., a rich number of cylinders) and at least one lean cylinder (e.g., a lean number of cylinders). First cylinder pattern 406 includes one rich cylinder (e.g., cylinder 1) and three lean cylinders in consecutive firing order (e.g., cylinder 3, cylinder 4, and cylinder 2). Thus, there are three consecutive lean firing events between each rich firing event. First cylinder pattern 406 may be selected when the catalyst washcoat storage capacity of catalyst 404 includes a higher storage capacity for $O_2$. Second cylinder pattern 408 includes one lean cylinder (e.g., cylinder 1) and three rich cylinders in consecutive firing order (e.g., cylinder 3, cylinder 4, and cylinder 2). Thus, there are three consecutive rich firing events between each lean firing event. Second cylinder pattern 408 may be selected when the catalyst washcoat storage capacity includes a higher storage capacity for hydrocarbons and $H_2$. The third cylinder pattern 410 includes two rich cylinders (e.g., cylinder 1 and cylinder 3) in consecutive firing order, and two lean cylinders (e.g., cylinder 4 and cylinder 2) in consecutive firing order. Thus, the pattern alternates between consecutive pairs of rich firing events and consecutive pairs of lean firing events. Similarly, fourth cylinder pattern 412 includes two lean cylinders (e.g., cylinder 1 and cylinder 3) in consecutive firing order and two rich cylinders (e.g., cylinder 4 and cylinder 2) in consecutive firing order. Thus, fourth cylinder pattern 412 alternates between pairs of lean firing events and consecutive pairs of rich firing events. Both of the third cylinder pattern 410 and the fourth cylinder pattern 412 may be selected for a catalyst washcoat storage capacity with intermediate $O_2$, $H_2$, and HC storage capacity. The fifth cylinder pattern 414 includes a first rich cylinder (e.g., cylinder 1), followed by first lean cylinder (e.g., cylinder 3), followed by a second rich cylinder (e.g., cylinder 4), followed by a second lean cylinder (e.g., cylinder 2). Thus, the fifth cylinder pattern 414 alternates between rich cylinder firings and lean cylinder firings. Finally, the sixth cylinder pattern 416 includes a first lean cylinder (e.g., cylinder 1), followed by a first rich cylinder (e.g., cylinder 3), followed by a second lean cylinder (e.g., cylinder 4), followed by a second rich cylinder (e.g., cylinder 2). Further, each of the fifth cylinder pattern 414 and the sixth cylinder pattern 416 may be selected for a catalyst washcoat storage capacity with low $O_2$, $H_2$, and HC storage capacity. The cylinder patterns shown in FIGS. 4A-4F are intended as non-limiting examples, and the controller may select other cylinder patterns based on engine operating conditions.

In an alternate embodiment, each cylinder may alternate between rich and lean strategies, or each cylinder may have a pattern like rich-lean-lean or lean-rich-rich. For example, for a first number of engine cycles, a first cylinder set may operate rich while a second cylinder set operates lean, based on a selected cylinder pattern. Next, for a second number of engine cycles, the first cylinder set may operate lean while the second cylinder set operates rich, based on a selected cylinder pattern. As one example, the engine may alternate between operating with the first cylinder pattern, wherein cylinder 1 is operated rich while cylinder 2, cylinder 3, and cylinder 4 are operated lean, and operating in the second cylinder pattern, wherein cylinder 1 is operated lean while cylinder 2, cylinder 3, and cylinder 4 are operated rich. In this way, each cylinder may alternate between rich and lean strategies while operating in the split lambda catalyst heating mode.

Returning now to FIG. 3, the controller may determine which of the cylinders of the engine are included in the rich cylinder set and which of the cylinders of the engine are included in the lean cylinder set based on the cylinder pattern selected at 318. As a non-limiting example, in a four-cylinder engine, if the cylinder pattern of FIG. 4A (e.g., cylinder pattern 406) is selected at 318 responsive to a catalyst washcoat storage capacity including a higher storage capacity for $O_2$, the controller may determine that the rich cylinder set comprises cylinder 1, and the lean cylinder set comprises cylinder 2, cylinder 3, and cylinder 4. As another non-limiting example, in a four-cylinder engine, if the cylinder pattern of FIG. 4C (e.g., cylinder pattern 410) is selected at 318, based on a catalyst washcoat storage capacity with intermediate $O_2$, $H_2$, and HC storage capacity, the controller may determine that the rich cylinder set comprises cylinder 1 and cylinder 3, while the lean cylinder set comprises cylinder 2 and cylinder 4. For example, as illustrated by the example cylinder patterns in FIGS. 4A-4F, a cylinder pattern with a relatively high number of consecutive lean firing events may be selected as a catalyst washcoat oxygen storage capacity increases. Further, a cylinder pattern with a relatively high number of consecutive rich firing events may be selected as a catalyst washcoat hydrocarbon storage capacity and/or a catalyst washcoat hydrogen storage capacity increases.

Operating in the split lambda catalyst heating mode further includes determining a desired lambda split based on the threshold lambda split (as determined at 316) and the desired catalyst heating amount (as determined at 314), as indicated at 320. As one example, the controller may determine the desired lambda split based on a desired temperature increase and the threshold lambda split. For example, the controller may input the desired temperature decrease and the current engine operating conditions, such engine speed, engine load, and the current exhaust gas temperature, into one or more look-up tables, functions, and maps, which may output the lambda split to achieve the desired temperature decrease. Further, the controller may adjust the desired lambda split by the threshold lambda split determined at 316 in order to reduce soot formation in the rich cylinder set. Further, the lambda split may not exceed a threshold value above which misfire may occur, for example.

Operating in the split lambda catalyst heating mode further includes adjusting an AFR and a fuel injection timing for each of the rich cylinder set and the lean cylinder set, as indicated at 322. Based on the determined lambda split, the controller may determine a first, rich AFR for the rich cylinder set and a second, lean AFR for the lean cylinder set. For example, the controller may input the desired lambda split and the engine operating conditions into one or more look-up tables, maps, or functions, which may output the first, rich AFR and the second, lean AFR. In one example, the lambda split between the first cylinder set and the second cylinder set may be gradually increased over a plurality of engine cycles. For example, the lambda split may be incrementally increased cycle-by-cycle until the threshold lambda split is reached. This may include the controller further enriching the first set of cylinders each engine cycle and further enleaning the second set of cylinders by a corresponding amount to maintain an approximately stoichiometric exhaust gas mixture at the catalyst. For example, a degree of enrichment of the first set of cylinders may be equal to a degree of enleanment of the second set of cylinders each engine cycle. Thus, as one example, the difference between the first, rich AFR and the second, lean AFR may increase each engine cycle. In another example, the lambda split between the first set of cylinders and the second set of cylinders may be stepped to the threshold lambda split over one engine cycle.

In one example, the first, rich AFR and the second, lean AFR may be determined such that global stoichiometry is maintained during each engine cycle. In another example, global stoichiometry may be maintained at the catalyst over a period of time by alternating between enriched engine operation and enleaned engine operation. For example, the engine may run rich during a first engine cycle, and may run lean during a second engine cycle, such that global stoichiometry of the exhaust gas is maintained across the two engine cycles.

Further, the controller may adjust a fuel injection timing for the lean cylinder set and a fuel injection timing for the rich cylinder set. For example, the controller may command early fuel injection timing for the rich cylinder set, while commanding a split injection (e.g., stratified injection) for the lean cylinder set in order to increase combustion stability and CO production in the lean cylinder set. For example, a first amount of fuel may be injected earlier in each combustion cylinder for the lean cylinder set, and a second amount of fuel may be injected late in a compression stroke of each cylinder of the lean cylinder set, such that there is a locally rich mixture near the spark plug of each of the lean cylinders. The controller may adjust a pulse width of a signal FPW sent to the fuel injector of each cylinder based on the commanded AFR and commanded fuel injection timing of the particular cylinder (e.g., whether the cylinder is in the first set or the second set) and a cylinder air charge amount, such as via a look-up table or function, in order to operate the first cylinder set at the rich AFR and the second cylinder set at the lean AFR. As an illustrative, non-limiting example, the controller may determine a threshold lambda split of 0.2. In this example, the first, rich AFR is set to 0.9, and the second, lean AFR is set to 1.1, thus maintaining globally stoichiometric operation.

In one example, the lambda split between the first set of cylinders and the second set of cylinders may be stepped to the determined lambda split over one engine cycle. For example, the controller may adjust a pulse width of a signal FPW sent to the fuel injector of each cylinder based on the commanded AFR of the particular cylinder (e.g., whether the cylinder is in the first set or the second set) and a cylinder air charge amount, such as via a look-up table or function, in order to operate the first cylinder set at the rich AFR and the second cylinder set at the lean AFR. In an alternative example, the lambda split between the first cylinder set and the second cylinder set may be gradually increased over a plurality of engine cycles. For example, the lambda split may be incrementally increased cycle-by-cycle until the determined lambda split is reached. This may include the controller further enriching the first set of cylinders each engine cycle and further enleaning the second set of cylinders by a corresponding amount to maintain a stoichiometric exhaust gas mixture at the catalyst.

Operating in the split lambda catalyst heating mode may further include adjusting the spark timing for each cylinder set (e.g., each of the rich cylinder set and the lean cylinder set), as indicated at 324. As an example, the controller may refer to one or more look-up tables to determine an amount of spark retard for each set of cylinders, such as by inputting the demanded amount of engine torque and the commanded AFR of the cylinder set into the one or more look-up tables, maps, or functions. As another example, the controller may determine the retarded spark timing for each set of cylinders based on logic rules that are a function of the demanded amount of engine torque and the commanded AFR of the cylinder or cylinder set. It may be understood that the determined spark timing for the rich cylinder set may be further retarded than the spark timing for the lean cylinder set in order to maintain torque balance between the rich and lean cylinders. Further, the lean cylinder set may be operating with spark advance due to a slower burn rate in the lean cylinder set. In some examples, the spark timing for each cylinder set may be iteratively adjusted across a plurality of engine cycles until each cylinder set reaches the determined timing and/or the engine torque reaches the desired decreased engine torque. As an example, the spark retard of the rich cylinder set may be initiated at a faster rate compared with the lean cylinder set so that both cylinder sets reach their corresponding determined spark timing at the same engine cycle, with the indicated torque balanced between the two cylinder sets each engine cycle.

At 326, method 300 includes determining whether the catalyst midbed temperature exceeds the threshold catalyst midbed temperature, as described above at 304. For example, the controller may estimate the catalyst midbed temperature by inputting the exhaust temperature, engine temperature, and other engine operating conditions into one or more look-up tables, maps, or functions, which may output the catalyst midbed temperature.

If the catalyst midbed temperature does not exceed the threshold catalyst midbed temperature at 326 (e.g., the catalyst midbed temperature is below the threshold catalyst midbed temperature), method 300 returns to 308. Returning to 308 may providing additional catalyst heating via spark retard and/or operating in the split lambda catalyst heating mode, for example. As an example, the engine may continue to operate in the split lambda catalyst heating mode, and the controller may adjust the desired lambda split as the desired amount of catalyst heating changes. For example, as the desired amount of catalyst heating decreases, the controller may decrease the desired lambda split by a corresponding amount. Further, as the engine continues to operate in the split lambda catalyst heating mode, the controller may adjust the cylinder pattern based on the estimated catalyst washcoat storage capacity while operating in the split lambda catalyst heating mode. For example, as the oxygen storage capacity of the catalyst washcoat increases with engine temperature, the controller may select a different cylinder pattern.

If the catalyst midbed temperature does exceed the threshold catalyst midbed temperature at 326, method 300 proceeds to 328, and includes operating the engine in a nominal operating mode. For example, the controller may adjust the AFR of each cylinder to stoichiometry and may adjust the spark timing and the fuel injection timing for each cylinder accordingly. Method 300 may then end. In this way, a temperature of a catalyst may be increased by operating in a split lambda catalyst heating mode, thus decreasing vehicle emissions. Further, increasing the catalyst temperature via split lambda may be more fuel efficient relative to increasing the catalyst temperature via additional spark retard.

Turning now to FIG. 5, an exemplary timing chart 500 of two cylinders operating in the split lambda catalyst heating mode is shown. Each of the two cylinders may have the configuration of cylinder 130 of engine 10 in FIG. 1, for example. In particular, FIG. 5 shows an example cylinder timing for a rich cylinder (e.g., of a rich cylinder set) and an example cylinder timing for a lean cylinder (e.g., of a lean cylinder set). Timing chart 500 shows a timing chart for a single combustion cycle, wherein the combustion cycle (e.g., a cylinder cycle) includes the completion of four strokes (e.g., intake, compression, power, and exhaust) within the cylinder. Although the rich cylinder and the lean cylinder are shown on the same timing chart, the rich cylinder and the lean cylinder do not undergo each stroke simultaneously. For example, the two cylinders may be staggered based on a cylinder firing pattern.

A piston position relative to top dead center (TDC), bottom dead center (BDC), and the four strokes of the combustion cycle (intake, compression, power, and exhaust) is shown in plot 502. Further, an actuation signal for a cylinder fuel injector in the rich cylinder is shown in plot 504, an actuation signal for a cylinder fuel injector in the lean cylinder is shown in dashed plot 506, a spark plug actuation signal for the rich cylinder is shown in plot 508, and a spark plug actuation signal for the lean cylinder is shown in dashed plot 510. For all of the above, the horizontal axis represents engine position (e.g., in crank angle degrees), with the crank angle degrees (CAD) increasing from left to right. The vertical axis represents each labeled parameter. For plot 502, the vertical axis shows the piston position relative to TDC. For each of plots 504, 506, 508, and 510, an increase in a magnitude of the parameter above zero indicates actuation of the corresponding injector or spark plug. Further, the stroke of the combustion cycle is indicated at the top of timing chart 500, with the intake stroke corresponding to the interval from 0 CAD to 180 CAD, the compression stroke corresponding to the interval from 180 CAD to 360 CAD, the power stroke corresponding to the interval from 360 CAD to 540 CAD, and the exhaust stroke corresponding to the interval from 540 CAD to 720 CAD.

At the start of the intake stroke (e.g., at 0 CAD), the piston position is at TDC (plot 502). During the intake stroke, the piston position decreases as air is drawn into the cylinder. At CAD1 (e.g., around 60 CAD), fuel is injected into the rich cylinder (plot 504). Next, at CAD2 (e.g., around 70 CAD), fuel is injected into the lean cylinder (plot 506). However, as shown, the fuel injector actuation signal for the lean cylinder (plot 506) is shorter relative to the fuel injector actuation signal for the rich cylinder (plot 504). In particular, fuel is injected into the rich cylinder between CAD1 and CAD3, while the fuel injector actuation signal for the lean cylinder (plot 506) begins at CAD2 and ends before CAD3. Accordingly, less fuel is injected into the lean cylinder during the intake stroke. As such, the air-fuel mixture in the lean cylinder has a higher AFR.

During the compression stroke, the piston position moves from BDC back towards TDC (plot 502), compressing air in the cylinder. At CAD4, additional fuel is injected into the lean cylinder (plot 506). Although additional fuel is injected into the lean cylinder, the total amount of fuel injected into the lean cylinder is less than the amount of fuel injected into the rich cylinder at CAD1. For example, injecting additional fuel into the lean cylinder during the compression stroke may create a cylinder air-fuel mixture that is locally rich near the spark plug, while lean overall. Therefore, the air-fuel mixture in the rich cylinder is homogenous due to early fuel injection timing, while the air-fuel mixture in the lean cylinder is stratified due to the late injection of additional fuel (e.g., stratified injection timing). Shortly after the additional fuel is injected into the lean cylinder (e.g., around 310 CAD), the spark plug in the lean cylinder is actuated (plot 510), igniting the lean air-fuel mixture in the cylinder. Further, at CAD6, (e.g., around 350 CAD), the spark plug in the rich cylinder actuates (plot 508), igniting the rich air-fuel mixture in the rich cylinder. For each of the rich cylinder and the lean cylinder, igniting the air-fuel mixture generates torque for the engine.

Thus, the lean cylinder is operated with split fuel injection, so that a first amount of fuel is injected during the intake stroke while a second amount of fuel is injected during the compression stroke just before spark plug actuation, so that the local AFR is rich near the spark plug. Further, by operating the rich cylinder with early fuel injection, the air-fuel mixture in the rich cylinder may have increased mixing, relative to a cylinder with later fuel injection. Further, by operating the lean cylinder with spark advance and the rich cylinder with spark retard to account for the different burn rates of the rich and lean mixtures, torque balancing between the lean cylinder and the rich cylinder is increased.

Next, FIG. 6 shows a prophetic example timeline 600 for operating an engine in the split lambda catalyst heating mode. The engine may be engine 10 shown in FIGS. 1 and 2, for example, and controlled by controller 12 of FIGS. 1 and 2. Further, the engine may include a three-way catalyst, such as catalyst 70 of FIG. 2. Some quantities shown in timeline 600 may apply to one of a first cylinder set and a second cylinder set. Each cylinder of the first cylinder set and each cylinder of the second cylinder set may include the cylinder configuration of cylinder 130 shown in FIG. 1, for example, and may include a spark plug as an ignition source (e.g., spark plug 92) and a fuel injector for injecting fuel into the cylinder (e.g., fuel injector 66). When the engine operates in the split lambda catalyst heating mode, the first cylinder set may be enriched, while the second cylinder set may be enleaned. A desired amount of catalyst heating (e.g., an amount of catalyst heating for the catalyst to reach an efficient operating temperature) is shown in plot 602, a catalyst midbed temperature (e.g., an estimated temperature at the catalyst midbed) is shown in plot 604, a catalyst front face temperature (e.g., an estimated temperature at the catalyst front face) is shown in plot 606, an amount of lambda split (e.g., a difference between a commanded lambda for the first cylinder set and a commanded lambda for the second cylinder set) is shown in plot 608, an injection strategy for the first cylinder set is shown in plot 610, an injection strategy for the lean cylinder bank is shown in plot 612, an amount of spark retard for catalyst heating is shown in plot 614. Further, a threshold catalyst midbed temperature is shown by dashed line 616, a threshold catalyst front face temperature is shown by dashed line 618, and a threshold lambda split (e.g., a threshold lambda split based on soot formation) is shown in dashed plot 620.

At time t0, the catalyst midbed temperature (plot 604) is below the threshold catalyst midbed temperature (dashed line 616), indicating that catalyst heating is requested, as shown by the high desired amount of catalyst heating (plot 602). However, because the catalyst front face temperature (plot 606) is below the threshold catalyst front face temperature (dashed line 618), only spark retard is indicated for providing catalyst heating. Accordingly, the lambda split is zero at time t0 (plot 608), the injection strategy for both the first cylinder bank (plot 610) and the second cylinder bank (dashed plot 612) is homogenous, and the amount of spark retard for catalyst heating is high (plot 614). Further, at time t0, the threshold lambda split is zero (dashed plot 620), due to the low estimated surface temperatures inside the cylinders. However, as the engine temperature increases between time t0 and time t1, the threshold lambda split (dashed plot 620) increases.

At time t1, the catalyst midbed temperature (plot 604) remains below the threshold catalyst midbed temperature, and the catalyst front face temperature (plot 608) increases above the threshold catalyst front face temperature (dashed plot 618), indicating that the catalyst front face is warm enough for exothermic reactions between excess $O_2$, CO, and $H_2$ in split lambda exhaust. In response to the increased catalyst front face temperature, the engine operates in the split lambda catalyst heating mode. Accordingly, the amount of lambda split begins to increase at time t1 (plot 608), such that the difference between the commanded lambda for the first cylinder set and the commanded lambda for the second cylinder set increases without exceeding the threshold lambda split (dashed plot 620). Further, due to the engine operating in the split lambda catalyst mode, a stratified injection strategy is used for the second cylinder set at time t1 (plot 612), while the first cylinder set continue to operate with a homogenous injection strategy (plot 610). Because operating in the split lambda catalyst heating mode increases the catalyst temperature, additional spark retard is not requested in order to increase the catalyst temperature. As such, the amount of spark retard begins to decrease at time t1 (plot 614).

Between time t1 and time t2, as the engine operates in the split lambda catalyst heating mode, the amount of lambda split increases (plot 608) without exceeding the threshold lambda split (dashed plot 620), the second cylinder set continues to operate with the stratified injection strategy (dashed plot 612), and the amount of spark retard continues to decrease (plot 614). Note that the threshold lambda split (dashed plot 620) increases between time t0 and time t2, as changing engine operating conditions, such as increasing engine speed and engine temperature, change the effect of lambda split on soot formation in the cylinders. In particular, the threshold lambda split increases in proportion to engine speed and engine temperature.

At time t2, the lambda split (plot 608) reaches the threshold lambda split (dashed plot 620), and the amount of spark retard decreases to zero (plot 614). Note that in some examples, spark retard and/or spark advance may be applied to each of the first cylinder set and the second cylinder set, in order to balance torque while operating in the split lambda catalyst heating mode. For example, spark advance may be applied to the second cylinder set while operating in the split lambda catalyst heating mode, while spark retard may be applied to the first cylinder set. Between time t2 and time t3, while operating in the split lambda catalyst heating mode, the catalyst midbed temperature (plot 604) and the catalyst front face temperature (plot 606) continue to increase.

Between time t3 and time t4, the catalyst midbed temperature (plot 604) approaches the threshold catalyst midbed temperature (dashed line 616). Due to the increase in the catalyst midbed temperature, the desired amount of catalyst heating (plot 602) decreases. In response, the amount of lambda split decreases (plot 608) between time t3 and time t4, such that a difference between the commanded lambda of the first cylinder set and the second cylinder set decreases. However, between time t3 and time t4, the second cylinder set continues to operate with the stratified injection strategy (dashed plot 612), while the first cylinder set continues to operate with the homogenous injection strategy (plot 610).

At time t4, the catalyst midbed temperature (plot 604) increases above the threshold catalyst midbed temperature (dashed line 616), indicating that additional catalyst heating is no longer requested. For example, when the catalyst midbed temperature (plot 604) reaches the threshold catalyst midbed temperature (dashed line 616), the catalyst may efficiently decrease engine emissions, and as such, the catalyst may not request any additional catalyst heating. Accordingly, the desired amount of catalyst heating (plot 602) at time t4 is zero. In response to the desired amount of catalyst heating at zero, the lambda split (plot 608) is zero, and all cylinders of the first cylinder set and the second cylinder set operate with the homogenous injection strategy (plot 610 and dashed plot 612). The amount of spark retard remains at zero (plot 614).

In this way, a catalyst temperature may be increased to a threshold catalyst temperature for efficient catalyst operation while maximizing engine efficiency and minimizing thermal losses between the engine and the catalyst. By operating with a lambda split while maintaining global stoichiometry, excess oxygen and excess CO and $H_2$ in the exhaust gas may react exothermically in the catalyst, generating heat. As such, operating with the lambda split increases the catalyst temperature and the engine efficiency compared to operating with spark retard. Because the exothermic reaction occurs at the catalyst, thermal energy is not lost as exhaust gas travels from the cylinders to the catalyst. Further, by determining a threshold lambda split based on soot formation, cylinder and particulate trap fouling may be decreased while operating with the lambda split. Finally, by selecting a cylinder pattern based on the estimated catalyst washcoat storage capacity, catalyst efficiency is increased while operating with the lambda split.

The technical effect of partially enriching an engine while maintaining the engine at global stoichiometry and differentially adjusting spark timing and fuel injection timing is that catalyst temperature increases, which increases an efficiency of the catalyst in reducing vehicle emissions.

As an example, a method, comprises: while operating an engine in a split lambda catalyst heating mode, adjusting a magnitude of a lambda split between a rich set of combustion events and a lean set of combustion events based on soot formation in the rich set of combustion events and lean combustion tolerance in the lean set of combustion events. In the preceding example, additionally or optionally, operating in the split lambda catalyst heating mode includes: selecting a cylinder pattern; advancing spark timing for the lean set of cylinders while retarding spark timing for the rich set of cylinders; and operating the rich set of cylinders with a rich air-fuel ratio (AFR) and the lean set of cylinders with a lean AFR, the rich AFR and the lean AFR determined based on the lambda split, exhaust gas from both the rich set of cylinders and the lean set of cylinder producing a stoichiometric air-fuel ratio at a catalyst. In one or both of the preceding examples, additionally or optionally, operating the rich set of cylinders with the rich AFR and the lean set of cylinders with the lean AFR includes injecting fuel with early injection timing in the rich set of cylinders, relative to an injection timing for the lean set of cylinders, and performing split fuel injection in the lean set of cylinders, wherein performing split fuel injection in the lean set of cylinders includes: for each cylinder in the lean set of cylinders, injecting a first amount of fuel during an intake stroke of the cylinder; and for each cylinder in the lean set of cylinders, injecting a second amount of fuel during a compression stroke of the cylinder prior to spark plug actuation. In any or all of the preceding examples, additionally or optionally, selecting the cylinder pattern includes determining which of the cylinders of the engine comprise the rich set of cylinders and which of the cylinders of the engine comprise the lean set of cylinders based on an estimated catalyst washcoat storage capacity for the catalyst. In any or all of the preceding examples, additionally or optionally, the estimated catalyst washcoat storage capacity is based on a catalyst age, a catalyst type, and a catalyst temperature, and wherein the estimated catalyst washcoat storage capacity includes at least one of an estimated catalyst washcoat oxygen storage capacity, an estimated catalyst washcoat hydrogen storage capacity, and an estimated catalyst washcoat hydrocarbon storage capacity. In any or all of the preceding examples, additionally or optionally, selecting the cylinder pattern further includes increasing a number of consecutive lean firing events as the estimated catalyst washcoat oxygen storage capacity increases, and increasing a number of consecutive rich firing events as the estimated catalyst washcoat hydrocarbon storage capacity increases. In any or all of the preceding examples, additionally or optionally, the magnitude of the lambda split is further based on a desired amount of catalyst heating. In any or all of the preceding examples, additionally or optionally, operating the engine in the split lambda catalyst heating mode is responsive to a catalyst front face temperature being above a threshold catalyst front face temperature and a catalyst midbed temperature being below a threshold catalyst midbed temperature. In any or all of the preceding examples, additionally or optionally, adjusting the magnitude of the lambda split between the rich set of cylinders and the lean set of cylinders based on soot formation in the rich set of cylinders includes determining a threshold rich AFR below which soot formation increases above a threshold amount, and wherein the lambda split is a difference between a lean relative AFR of the lean set of cylinders and a rich relative AFR of the rich set of cylinders.

As another example, a method comprises: responsive to a catalyst midbed temperature below a threshold catalyst midbed temperature and a catalyst front face temperature below a threshold catalyst front face temperature, operating an engine with spark retard; responsive to the catalyst midbed temperature below the threshold catalyst midbed temperature and the catalyst front face temperature exceeding the threshold catalyst front face temperature: selecting cylinders of an engine for a first set of cylinders and selecting cylinders of the engine for a second set of cylinders based on an estimated catalyst washcoat storage capacity of a catalyst; enleaning the first set of cylinders by a first amount of enleanment while enriching the second set of cylinders by a first amount of enrichment; advancing a spark timing for the first set of cylinders and retarding a spark timing for the second set of cylinders; and performing split fuel injection in the first set of cylinders and a single fuel injection in the second set of cylinders. In the preceding example, additionally or optionally, enleaning the first set of cylinders by a first amount of enleanment while enriching the second set of cylinders by a first amount of enrichment is responsive to a difference between the first amount of enleanment and the first amount of enrichment determined based on a desired amount of catalyst heating and an estimated soot formation of each cylinder. In one or both of the preceding examples, additionally or optionally, performing the split fuel injection includes injecting a first portion of fuel during an intake stroke of each cylinder of the first set of cylinders and injecting a second portion of fuel during a compression stroke of each cylinder of the first set of cylinders. In any or all of the preceding examples, additionally or optionally, selecting cylinders of the engine for the first set of cylinders and selecting cylinders of the engine for the second set of cylinders based on an estimated catalyst washcoat storage capacity includes: estimating a catalyst washcoat storage capacity based on catalyst age, catalyst type, and catalyst temperature, the catalyst washcoat storage capacity including at least one of a catalyst washcoat oxygen storage capacity, a catalyst washcoat hydrogen storage capacity, and a catalyst washcoat hydrocarbon storage capacity; selecting a cylinder pattern with a lower number of consecutive lean firing events responsive to the catalyst washcoat oxygen storage capacity decreasing; selecting a cylinder pattern with a lower number of consecutive rich firing events responsive to the catalyst washcoat hydrocarbon storage capacity decreasing and the catalyst washcoat hydrogen storage capacity decreasing; assigning each cylinder of the engine to one of the first set of cylinders and the second set of cylinders based on the selected cylinder pattern. In any or all of the preceding examples, additionally or optionally, assigning each cylinder of the engine to one of the first set of cylinders and the second set of cylinders based on the selected cylinder pattern further includes alternating each cylinder of the engine between the first set of cylinders and the second set of cylinders after a number of engine cycles. In any or all of the preceding examples, additionally or optionally, exhaust gas from both the first set of cylinders and the second set of cylinders produces a stoichiometric air-fuel ratio at the catalyst.

As yet another example, a system comprises: a spark ignition engine including a plurality of cylinders; a catalyst coupled in an exhaust passage of the spark ignition engine; and a controller with computer readable instructions stored in non-transitory memory that, when executed during engine operation, cause the controller to: during a first condition, increase a temperature of the catalyst by retarding spark timing by a same amount in every cylinder of the plurality of cylinders; and during a second condition, increase the temperature of the catalyst by operating a first set of the plurality of cylinders at a rich air-fuel ratio and a second set of the plurality of cylinders at a lean air-fuel ratio while retarding spark timing differently in the first set and the second set, a difference between the rich air-fuel ratio and the lean air-fuel ratio based on a desired amount of catalyst heating and a threshold lambda split. In the preceding example, additionally or optionally, the catalyst includes a front face and a midbed, the midbed positioned further downstream in the exhaust passage than the front face, the first condition is responsive to a temperature of the front face being below a threshold catalyst front face temperature and a temperature of the midbed being below a threshold catalyst midbed temperature, and the second condition is responsive to the temperature of the front face being above the threshold catalyst front face temperature and the temperature of the midbed being below the threshold catalyst midbed temperature. In one or both of the preceding examples, additionally or optionally, operating the first set of the plurality of cylinders at the rich air-fuel ratio and the second set of the plurality of cylinders at the lean air-fuel ratio produces a stoichiometric air-fuel ratio at the catalyst. In any or all of the preceding examples, additionally or optionally, the controller includes further instructions stored in non-transitory memory that, when executed, cause the controller to: during the second condition, operate the first set of the plurality of cylinders with early injection timing and operate the second set of the plurality of cylinders with stratified injection timing; and during the second condition, operate the second set of the plurality of cylinders with advanced spark timing relative to the first set of the plurality of cylinders. In any or all of the preceding examples, additionally or optionally, the controller includes further instructions stored in non-transitory memory that, when executed, cause the controller to: alternate between operating the first set of the plurality of cylinders at the rich air-fuel ratio and the lean air-fuel ratio; and alternate between operating the second set of the plurality of cylinders at the lean air-fuel ratio and the rich air-fuel ratio.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method, comprising:
while operating an engine in a split lambda catalyst heating mode, adjusting a magnitude of a lambda split between a rich set of combustion events in a rich set of cylinders and a lean set of combustion events in a lean set of cylinders based on soot formation in the rich set of combustion events and lean combustion tolerance in the lean set of combustion events, wherein operating in the split lambda catalyst heating mode includes:
selecting a cylinder pattern;
advancing spark timing for the lean set of cylinders while retarding spark timing for the rich set of cylinders; and
operating the rich set of cylinders with a rich air-fuel ratio (AFR) and the lean set of cylinders with a lean AFR, the rich AFR and the lean AFR determined based on the lambda split, exhaust gas from both the rich set of cylinders and the lean set of cylinder producing a stoichiometric air-fuel ratio at a catalyst; and
wherein operating the rich set of cylinders with the rich AFR and the lean set of cylinders with the lean AFR includes injecting fuel with early injection timing in the rich set of cylinders, relative to an injection timing for the lean set of cylinders, and performing split fuel injection in the lean set of cylinders, wherein performing split fuel injection in the lean set of cylinders includes:

for each cylinder in the lean set of cylinders, injecting a first amount of fuel during an intake stroke of the cylinder; and for each cylinder in the lean set of cylinders, injecting a second amount of fuel during a compression stroke of the cylinder prior to spark plug actuation.

2. The method of claim 1, wherein selecting the cylinder pattern includes determining which of the cylinders of the engine comprise the rich set of cylinders and which of the cylinders of the engine comprise the lean set of cylinders based on an estimated catalyst washcoat storage capacity for the catalyst.

3. The method of claim 2, wherein the estimated catalyst washcoat storage capacity is based on a catalyst age, a catalyst type, and a catalyst temperature, and wherein the estimated catalyst washcoat storage capacity includes at least one of an estimated catalyst washcoat oxygen storage capacity, an estimated catalyst washcoat hydrogen storage capacity, and an estimated catalyst washcoat hydrocarbon storage capacity.

4. The method of claim 3, wherein selecting the cylinder pattern further includes increasing a number of consecutive lean firing events as the estimated catalyst washcoat oxygen storage capacity increases, and increasing a number of consecutive rich firing events as the estimated catalyst washcoat hydrocarbon storage capacity increases.

5. The method of claim 1, wherein the magnitude of the lambda split is further based on a desired amount of catalyst heating.

6. The method of claim 1, wherein operating the engine in the split lambda catalyst heating mode is responsive to a catalyst front face temperature being above a threshold catalyst front face temperature and a catalyst midbed temperature being below a threshold catalyst midbed temperature.

7. The method of claim 1, wherein adjusting the magnitude of the lambda split between the rich set of cylinders and the lean set of cylinders based on soot formation in the rich set of cylinders includes determining a threshold rich AFR below which soot formation increases above a threshold amount, and wherein the lambda split is a difference between a lean relative AFR of the lean set of cylinders and a rich relative AFR of the rich set of cylinders.

8. A method, comprising:
responsive to a catalyst midbed temperature below a threshold catalyst midbed temperature and a catalyst front face temperature below a threshold catalyst front face temperature, operating an engine with spark retard;
responsive to the catalyst midbed temperature below the threshold catalyst midbed temperature and the catalyst front face temperature exceeding the threshold catalyst front face temperature:
selecting cylinders of an engine for a first set of cylinders and selecting cylinders of the engine for a second set of cylinders based on an estimated catalyst washcoat storage capacity of a catalyst;
enleaning the first set of cylinders by a first amount of enleanment while enriching the second set of cylinders by a first amount of enrichment;
advancing a spark timing for the first set of cylinders and retarding a spark timing for the second set of cylinders; and
performing split fuel injection in the first set of cylinders and a single fuel injection in the second set of cylinders.

9. The method of claim 8, wherein enleaning the first set of cylinders by a first amount of enleanment while enriching the second set of cylinders by a first amount of enrichment is responsive to a difference between the first amount of enleanment and the first amount of enrichment determined based on a desired amount of catalyst heating and an estimated soot formation of each cylinder.

10. The method of claim 9, wherein performing the split fuel injection includes injecting a first portion of fuel during an intake stroke of each cylinder of the first set of cylinders and injecting a second portion of fuel during a compression stroke of each cylinder of the first set of cylinders.

11. The method of claim 8, wherein selecting cylinders of the engine for the first set of cylinders and selecting cylinders of the engine for the second set of cylinders based on an estimated catalyst washcoat storage capacity includes:
estimating a catalyst washcoat storage capacity based on catalyst age, catalyst type, and catalyst temperature, the catalyst washcoat storage capacity including at least one of a catalyst washcoat oxygen storage capacity, a catalyst washcoat hydrogen storage capacity, and a catalyst washcoat hydrocarbon storage capacity;
selecting a cylinder pattern with a lower number of consecutive lean firing events responsive to the catalyst washcoat oxygen storage capacity decreasing;
selecting a cylinder pattern with a lower number of consecutive rich firing events responsive to the catalyst washcoat hydrocarbon storage capacity decreasing and the catalyst washcoat hydrogen storage capacity decreasing;
assigning each cylinder of the engine to one of the first set of cylinders and the second set of cylinders based on the selected cylinder pattern.

12. The method of claim 11, wherein assigning each cylinder of the engine to one of the first set of cylinders and the second set of cylinders based on the selected cylinder pattern further includes alternating each cylinder of the engine between the first set of cylinders and the second set of cylinders after a number of engine cycles.

13. The method of claim 8, wherein exhaust gas from both the first set of cylinders and the second set of cylinders produces a stoichiometric air-fuel ratio at the catalyst.

14. A system, comprising:
a spark ignition engine including a plurality of cylinders;
a catalyst coupled in an exhaust passage of the spark ignition engine; and
a controller with computer readable instructions stored in non-transitory memory that, when executed during engine operation, cause the controller to:
during a first condition, increase a temperature of the catalyst by retarding spark timing by a same amount in every cylinder of the plurality of cylinders; and
during a second condition, increase the temperature of the catalyst by operating a first set of the plurality of cylinders at a rich air-fuel ratio and a second set of the plurality of cylinders at a lean air-fuel ratio while retarding spark timing differently in the first set and the second set, a difference between the rich air-fuel ratio and the lean air-fuel ratio based on a desired amount of catalyst heating and a threshold lambda split.

15. The system of claim 14, wherein the catalyst includes a front face and a midbed, the midbed positioned further downstream in the exhaust passage than the front face, the first condition is responsive to a temperature of the front face being below a threshold catalyst front face temperature and a temperature of the midbed being below a threshold catalyst midbed temperature, and the second condition is responsive to the temperature of the front face being above the threshold catalyst front face temperature and the temperature of the midbed being below the threshold catalyst midbed temperature.

16. The system of claim 14, wherein operating the first set of the plurality of cylinders at the rich air-fuel ratio and the second set of the plurality of cylinders at the lean air-fuel ratio produces a stoichiometric air-fuel ratio at the catalyst.

17. The system of claim 14, wherein the controller includes further instructions stored in non-transitory memory that, when executed, cause the controller to:
  during the second condition, operate the first set of the plurality of cylinders with early injection timing and operate the second set of the plurality of cylinders with stratified injection timing; and
  during the second condition, operate the second set of the plurality of cylinders with advanced spark timing relative to the first set of the plurality of cylinders.

18. The method of claim 14, wherein the controller includes further instructions stored in non-transitory memory that, when executed, cause the controller to:
  alternate between operating the first set of the plurality of cylinders at the rich air-fuel ratio and the lean air-fuel ratio; and
  alternate between operating the second set of the plurality of cylinders at the lean air-fuel ratio and the rich air-fuel ratio.

* * * * *